UNITED STATES PATENT OFFICE.

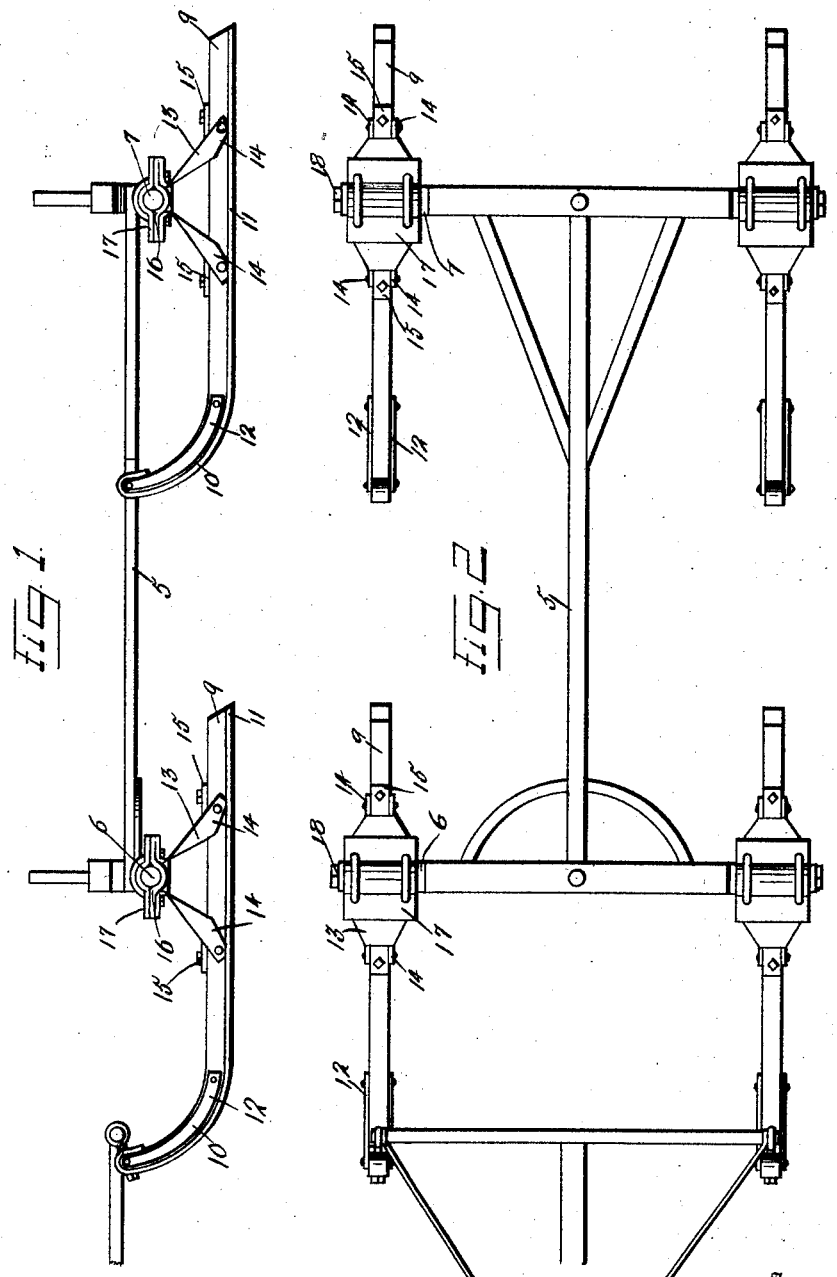

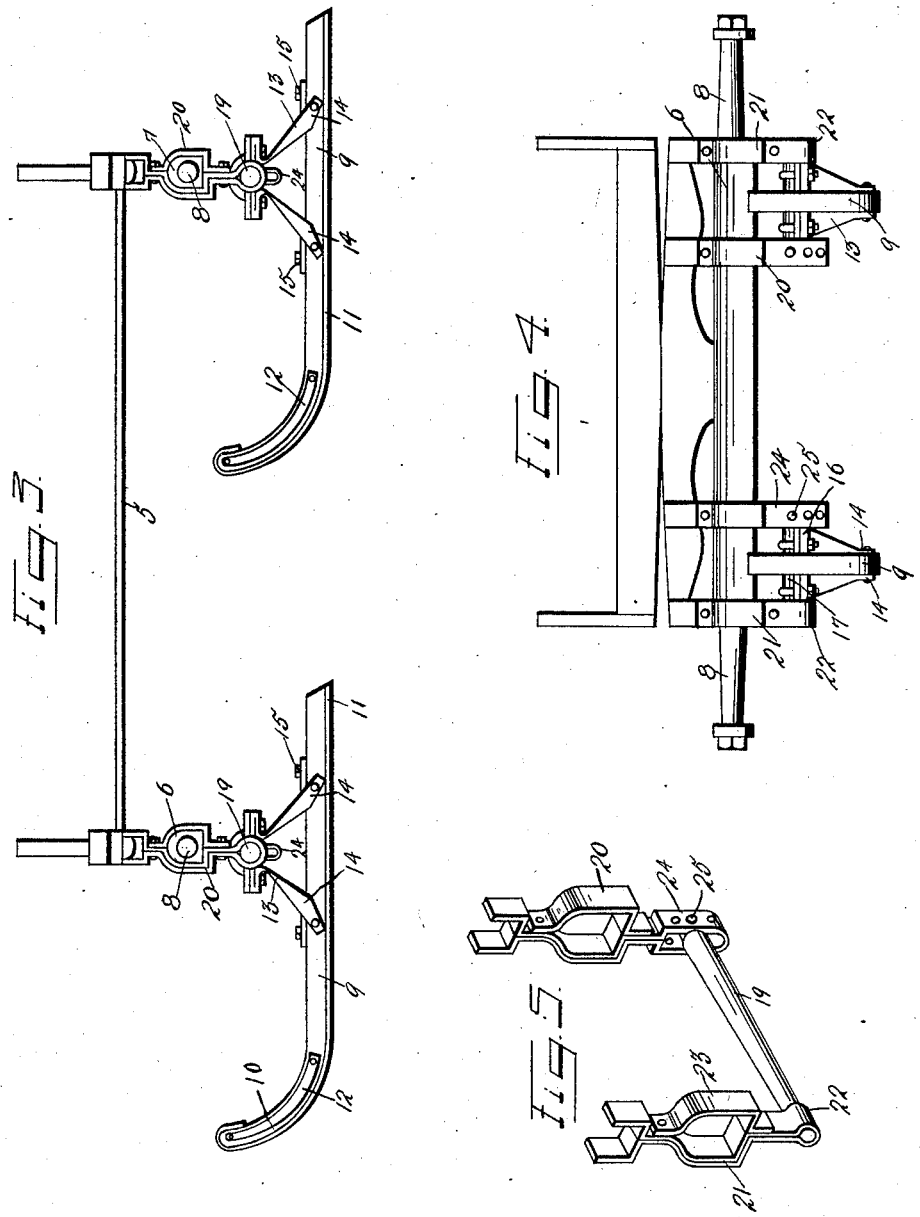

HENRY J. MILLER, OF MARION JUNCTION, SOUTH DAKOTA.

SLED-RUNNER.

1,034,134.     Specification of Letters Patent.     Patented July 30, 1912.

Application filed March 22, 1910. Serial No. 550,846.

*To all whom it may concern:*

Be it known that I, HENRY J. MILLER, a citizen of the United States, residing at Marion Junction, in the county of Turner, State of South Dakota, have invented certain new and useful Improvements in Sled-Runners; and I do hereby declare the following to be a full, clear, and exact description of the invention, such as will enable others skilled in the art to which it appertains to make and use the same.

The invention relates to detachable runners and more particularly to the class of sleigh runners adapted for use in substitution for the wheels upon carriages, wagons or the like.

The primary object of the invention is the provision of sleigh runners which may be detachably connected to the axle ends of a wagon in substitution for the wheels thereof whereby the ordinary wagon may be utilized as a sleigh for use in snowy weather, thus enabling the wagon to be mounted either upon runners or wheels to suit the convenience of the user.

Another object of the invention is the provision of a runner for a vehicle in which the said runner is provided with a boxing for detachably receiving the journal end of an axle of the ordinary construction employed on wagons or other vehicles so that the runner may be quickly and conveniently mounted upon the journal end in substitution for the ordinary vehicle wheel.

A further object of the invention is the provision of a runner of this character which is simple in construction, strong, durable and one that may be manufactured at a minimum cost.

With these and other objects in view the invention consists in the construction, combination and arrangement of parts as will be hereinafter more fully described, illustrated in the accompanying drawings disclosing the preferred forms of the embodiment of the invention, and as pointed out in the claims hereunto appended.

In the drawings:—Figure 1 is a side elevation of a vehicle frame and axles with the runners mounted thereon. Fig. 2 is a top plan view thereof. Fig. 3 is a side elevation of a slight modification. Fig. 4 is a front elevation thereof. Fig. 5 is a detail perspective view of one of the supplemental journals with its brackets removed from the vehicle frame.

Similar reference characters indicate corresponding parts throughout the several views in the drawings.

Referring to the drawings by numerals 5 designates generally a wagon frame having the front and rear axles 6 and 7 each terminating in the ordinary journal ends 8 for supporting the vehicle wheels the same not being shown for the sake of illustrating the manner of mounting the sleigh runners which will be hereinafter more fully described.

Each sleigh runner comprises a strip member 9 having a forward upwardly curved extremity 10 and against the bottom or under face of this strip member 9 is secured a metallic shoe 11 the latter extending from the rear end of the member forwardly over the upwardly curved front extremity 10 which latter is strengthened at opposite side faces by curved reinforcing bars 12 suitably secured thereto which prevent the splitting thereof. Rising from this runner and secured to the strip member 9 thereof is a truss 13 formed from a single strip of sheet metal cut at opposite extremities to provide vertical and horizontal securing ears 14 and 15 the latter being secured to the upper face of the member 9 while the vertical ears 14 are secured to the side faces thereof and this strip is bent to provide a socketed bearing 16, the socket being adapted to receive a portion of the journal end of the vehicle axle and detachably secured to this bearing 16 is a socketed cap 17 the latter being adapted to clamp the truss 13 upon the journal end 6 while the ordinary axle nut 18 prevents lateral displacement of the runner when fastened to the said journal end.

In Figs. 3, 4 and 5 in the drawings there is shown a slight modification of the construction wherein the runners are detachably connected to supplemental stud journals 19 which latter may be of any desirable construction and are clipped to the front and rear axles of a wagon frame. Each stud journal 19 is connected with the axle of the vehicle frame in spaced parallel relation thereto, by means of brackets 20 and 21, the bracket 21 being formed from a strip of material bent to provide an eye terminal 22 in which is fitted one end of the journal 19, while the remaining portion of the strip is bent to conform to the shape of the axle of the vehicle frame and to fit against one side face thereof. Detachably connected to this strip is a further strip 23 the latter being shaped correspondingly to the vehicle frame axle so that the said strips will securely embrace the same. The bracket 21 has its lower ends split to form spaced parallel extensions 24 between which is engaged the other end of the stud axle 19 and these extensions are formed with alining openings to permit the adjustment of a securing pin 25 the same being passed through the end of the stud axle to connect it with the bracket. The runners are connected to the stud axles 19 in lieu of being connected directly to the journal ends 8 of the front and rear axles of the vehicle frames, whereby the latter will be elevated a distance above its normal elevation relative to the ground when the ordinary vehicle wheels are mounted upon the journal ends 8 of the axles.

What is claimed is:—

1. The combination with a sled runner; of means for clipping the same to a journal end, said means comprising a truss formed of a single section of metal bent at two points intermediate of its ends with the bent portions in contact and with the portion therebetween bowed to form a bearing, the extremities of the section being then bent outwardly and downwardly and cut to provide vertical and horizontal securing ears attached to the runner upon the top and side faces thereof, a cap having an oppositely bowed portion and U-clips detachably securing the cap to the oppositely bent portions and extending through the latter.

2. The combination with a runner; of a truss having its lower portion secured to the runner and having its upper portion formed with oppositely extended portions providing an intermediate bearing, a bearing cap detachably secured to said oppositely extended portions, a supplemental stud journal engaged between said bearing portions and a pair of brackets adapted to secure the journal in spaced relation to a vehicle axle, one of said brackets being formed from a single section of metal bent upon itself to provide an eye at its lower end for receiving one end of the journal and having its upper portion formed to fit the axle and a strip detachably connected to the first named section through its doubled portions and correspondingly shaped to fit the axle, the other of said brackets having its lower portion provided with spaced side portions having a series of alining openings therethrough and a pin engaged through certain of said openings and the other end of the journal.

In testimony whereof, I affix my signature, in presence of two witnesses.

HENRY J. MILLER.

Witnesses:
WM. JANS,
J. M. WALLMANN.

Copies of this patent may be obtained for five cents each, by addressing the "Commissioner of Patents, Washington, D. C."